(12) United States Patent
Kamoshita et al.

(10) Patent No.: US 7,908,844 B2
(45) Date of Patent: Mar. 22, 2011

(54) EXHAUST PURIFICATION DEVICE OF INTERNAL COMBUSTION ENGINE

(75) Inventors: Shinji Kamoshita, Gotenba (JP); Shigeru Itabashi, Aichi (JP); Kuniaki Niimi, Susono (JP); Tomihisa Oda, Numazu (JP); Shinya Hirota, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1099 days.

(21) Appl. No.: 11/632,726

(22) PCT Filed: Apr. 28, 2006

(86) PCT No.: PCT/JP2006/009352
§ 371 (c)(1),
(2), (4) Date: Jan. 18, 2007

(87) PCT Pub. No.: WO2006/118344
PCT Pub. Date: Nov. 9, 2006

(65) Prior Publication Data
US 2007/0245723 A1     Oct. 25, 2007

(30) Foreign Application Priority Data
May 2, 2005 (JP) .................. 2005-134410

(51) Int. Cl.
*F01N 3/00* (2006.01)
*F01N 1/00* (2006.01)
*F01N 3/10* (2006.01)

(52) U.S. Cl. ............ 60/286; 60/274; 60/287; 60/292; 60/295; 60/324; 60/303

(58) Field of Classification Search ............ 60/295, 60/274, 286, 287, 292, 303, 324
See application file for complete search history.

(56) References Cited

U.S. PATENT DOCUMENTS

| | | | |
|---|---|---|---|
| 5,406,790 A | 4/1995 | Hirota et al. | |
| 6,779,339 B1 | 8/2004 | Laroo et al. | |
| 6,834,496 B2 * | 12/2004 | Nakatani et al. | 60/274 |

(Continued)

FOREIGN PATENT DOCUMENTS

DE    101 50 170 A1    9/2002

(Continued)

OTHER PUBLICATIONS

Shigeru Itabashi, et al.: *Study of Improvements in NOx Reduction Performance on Simultaneous Reduction system of PM and NOx*, © 2005 SAE International, Dec. 25, 2006, Toyota Motor Corporation.

*Primary Examiner* — Thomas E Denion
*Assistant Examiner* — Michael Carton
(74) *Attorney, Agent, or Firm* — Kenyon & Kenyon LLP

(57) ABSTRACT

In an internal combustion engine, a first exhaust passage and second exhaust passage branched from an exhaust passage are provided. An NOx storing reduction catalyst and a particulate filter are arranged in each exhaust passage. For example, when NOx should be released from the NOx storing reduction catalyst in the first exhaust passage, fuel is added from a fuel addition valve in the state with exhaust gas allowed to flow into only the first exhaust passage, while when the added fuel sticks to the NOx storing reduction catalyst, the first exhaust control valve is temporarily closed and the exhaust gas is made a rich air-fuel ratio.

28 Claims, 10 Drawing Sheets

U.S. PATENT DOCUMENTS

| | | | |
|---|---|---|---|
| 2003/0168116 A1* | 9/2003 | Brenner et al. | 137/875 |
| 2004/0006974 A1 | 1/2004 | Stroia et al. | |
| 2004/0103653 A1 | 6/2004 | Van Nieuwstadt et al. | |

FOREIGN PATENT DOCUMENTS

| JP | 06-173654 A | 6/1994 |
|---|---|---|
| JP | 07-259541 A | 10/1995 |
| JP | 2003-074328 A | 3/2003 |
| JP | 2003-106142 A | 4/2003 |
| JP | 2003-328741 A | 11/2003 |
| JP | 2004-092592 A | 3/2004 |
| JP | 06-272541 A | 9/2004 |

* cited by examiner (A)　　　　　　　　　(B)

(A)

(B)

(A)

(B)

(A)

(B)

(C)

(A)

(B)

(C)

(A)

(B)

(C)

EXHAUST PURIFICATION DEVICE OF INTERNAL COMBUSTION ENGINE

This is a 371 national phase application of PCT/JP2006/309352 filed 28 Apr. 2006, claiming priority to Japanese Patent Application No. 2005-134410 filed 02 May 2005, the contents of which are incorporated herein by reference.

FIELD OF THE INVENTION

The present invention relates to an exhaust purification device of an internal combustion engine.

BACKGROUND OF THE INVENTION

Known in the art is an internal combustion engine provided with a first exhaust passage and second exhaust passage branched from a common exhaust passage, providing an NOx absorbent storing NOx in the exhaust gas when the air-fuel ratio of inflowing exhaust gas is a lean air-fuel ratio and releasing stored NOx when the air-fuel ratio of inflowing exhaust gas is a rich air-fuel ratio in each of the first exhaust passage and second exhaust passage, providing a fuel addition valve in each of the first exhaust passage and second exhaust passage upstream of the NOx absorbent, and providing an exhaust control valve in each of the first exhaust passage and second exhaust passage downstream of the NOx absorbent (see for example Japanese Patent Publication (A) No. 2003-74328).

In this internal combustion engine, when the stored NOx is released from the NOx absorbent provided in the first exhaust passage, the exhaust control valve provided in the first exhaust passage is closed and fuel is added from the fuel addition valve provided in the first exhaust passage in the state with the exhaust gas standing in the first exhaust passage so as to maintain the air-fuel ratio of the exhaust gas in the first exhaust passage rich, and when the stored NOx is released from the NOx absorbent provided in the second exhaust passage, the exhaust control valve provided in the second exhaust passage is closed and fuel is added from the fuel addition valve provided in the second exhaust passage in the state with the exhaust gas standing in the second exhaust passage, whereby the air-fuel ratio of the exhaust gas in the second exhaust passage is kept rich.

However, in this internal combustion engine, there is the problem that two fuel addition valves are required for making the NOx absorbents release NOx. Further, a big problem is that these fuel addition valves are arranged considerably far from the engine, so it is necessary to lay fuel feed pipes to a considerable distance from the engine.

SUMMARY OF THE INVENTION

An object of the present invention is to provide an exhaust purification device of an internal combustion engine able to reduce the number of the fuel addition valves and able to make the mounting positions of the fuel addition valves closer to the engine.

According to the present invention, there is provided an exhaust purification device of an internal combustion engine provided with a first exhaust passage and a second exhaust passage branched from a common exhaust passage and providing an NOx absorbent storing NOx in an exhaust gas when the air-fuel ratio of inflowing exhaust gas is a lean air-fuel ratio and releasing stored NOx when the air-fuel ratio of inflowing exhaust gas is a rich air-fuel ratio in each of the first exhaust passage and second exhaust passage, wherein a fuel addition valve is arranged in the common exhaust passage upstream of the first exhaust passage and second exhaust passage and, when NOx should be released from the NOx absorbent arranged in the first exhaust passage, fuel added from the fuel additional valve is guided into the first exhaust passage and, after the fuel is guided into the first exhaust passage, the first exhaust passage is closed so as to maintain the air-fuel ratio of the exhaust gas in the first exhaust passage rich by using this fuel and, when NOx should be released from the NOx absorbent arranged in the second exhaust passage, fuel added from the fuel additional valve is guided into the second exhaust passage and, after the fuel is guided into the second exhaust passage, the second exhaust passage is closed so as to maintain the air-fuel ratio of the exhaust gas in the second exhaust passage rich by using this fuel.

DETAILED DESCRIPTION

Figure 1:
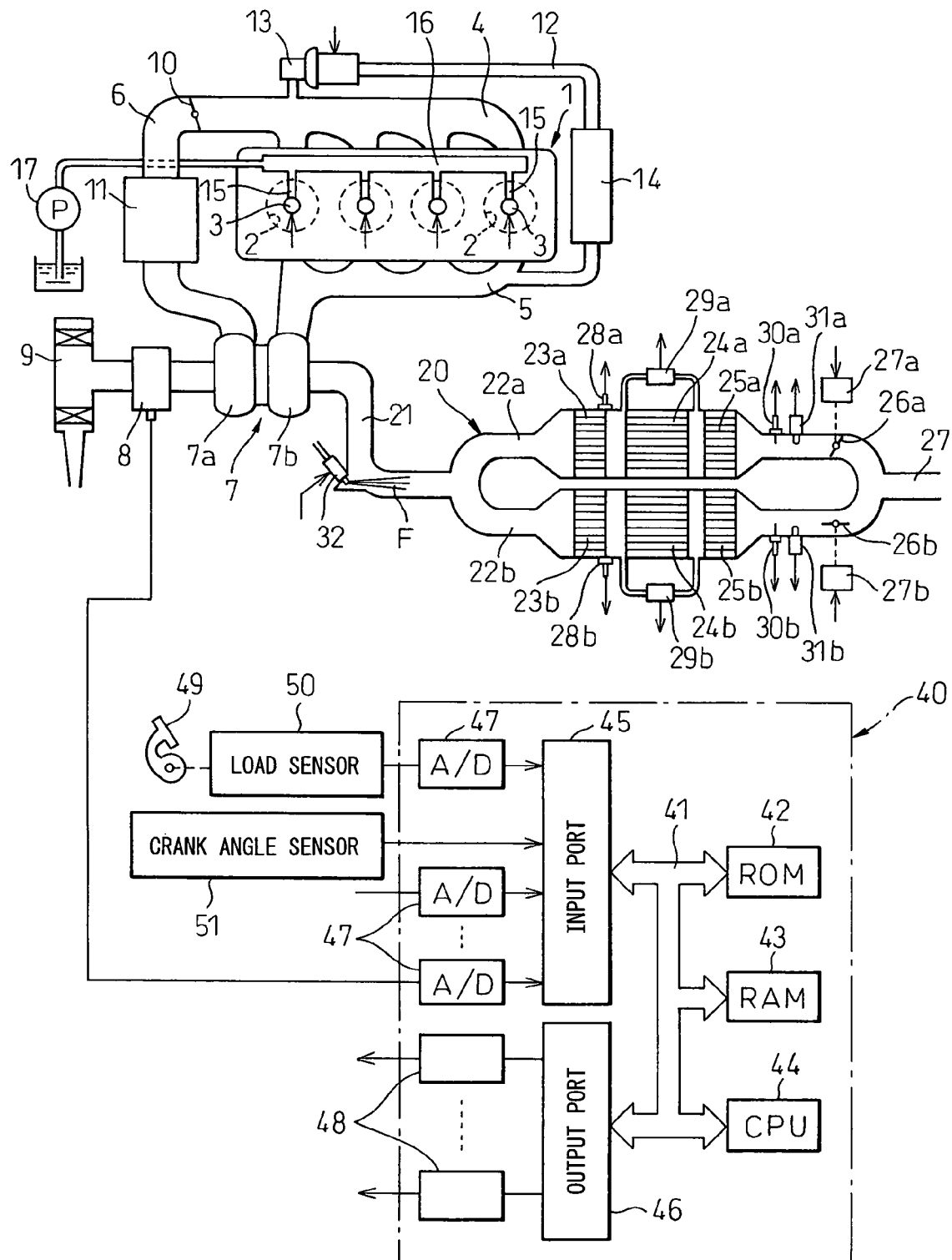
FIG. 1 is an overview of a compression ignition type internal combustion engine.

FIG. 1 shows an overview of a compression ignition type internal combustion engine.

Referring to FIG. 1, 1 indicates an engine body, 2 a combustion chamber of a cylinder, 3 an electronic control type fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an air flow meter 8 to an air cleaner 9. Inside the intake duct 6 is arranged an electrically controlled throttle valve 10. Further, around the intake duct 6 is arranged a cooling system 11 for cooling the intake air flowing through the intake duct 6. In the embodiment shown in FIG. 1, the engine cooling water is guided to the cooling system 11 where the engine cooling water cools the intake air. On the other hand, the exhaust manifold 5 is connected to an inlet of an exhaust turbine 7b of the exhaust turbocharger 7, while the outlet of the exhaust turbine 7b is connected to an exhaust after treatment device 20.

The exhaust manifold 5 and the intake manifold 4 are connected to each other through an exhaust gas recirculation (hereinafter referred to as an "EGR") passage 12. Inside the EGR passage 12 is arranged an electrically controlled EGR control valve 13. Further, around the EGR passage 12 is arranged a cooling system 14 for cooling the EGR gas flowing through the EGR passage 12. In the embodiment shown in FIG. 1, the engine cooling water is guided inside the cooling system 14, where the engine cooling water cools the EGR gas. On the other hand, each fuel injector 3 is connected through a fuel feed pipe 15 to a common rail 16. This common rail 16 is supplied with fuel from an electrically controlled variable discharge fuel pump 17. The fuel supplied from the common rail 16 is supplied through each fuel feed pipe 15 to a fuel injector 3.

The exhaust after treatment device 20 is provided with a common exhaust passage 21 connected to an outlet of the exhaust turbine 7b and a first exhaust passage 22a and second exhaust passage 22b branched from this common exhaust passage 21. Inside the first exhaust passage 22a are arranged, in order from the upstream side, a first NOx storing reduction catalyst 23a, a first particulate filter 24a, a first oxidation catalyst 25a, and a first exhaust control valve 26a driven by an actuator 27a, while inside the second exhaust passage 22b are arranged, in order from the upstream side, a second NOx storing reduction catalyst 23b, a second particulate filter 24b, a second oxidation catalyst 25b, and a second exhaust control valve 26b driven by an actuator 27b. These first exhaust passage 22a and second exhaust passage 22b merge at a common exhaust pipe 27 downstream of the first exhaust control valve 26a and second exhaust control valve 26b.

Further, the first exhaust passage 22a is provided inside it with a temperature sensor 28a for detecting the temperature of the first NOx storing reduction catalyst 23a, a first differential pressure sensor 29a for detecting the differential pressure before and after the first particulate filter 24a, and a temperature sensor 30a and air-fuel ratio sensor 31a for detecting the temperature and air-fuel ratio of the exhaust gas exhausted from the first oxidation catalyst 25a, while the second exhaust passage 22b is provided inside it with a temperature sensor 28b for detecting the temperature of the second NOx storing reduction catalyst 23b, a second differential pressure sensor 29b for detecting the differential pressure before and after the second particulate filter 24b, and a temperature sensor 30b and air-fuel ratio sensor 31b for detecting the temperature and air-fuel ratio of the exhaust gas exhausted from the second oxidation catalyst 25b.

On the other hand, as shown in FIG. 1, a fuel addition valve 32 common for the first exhaust passage 22a and second exhaust passage 22b is arranged in the common exhaust passage 21 upstream of the first exhaust passage 22a and second exhaust passage 22b. This fuel addition valve 32 adds fuel as shown by F in FIG. 1. In the embodiment according to the present invention, this fuel is diesel oil.

The electronic control unit 40 is comprised of a digital computer and is provided with a ROM (read only memory) 42, a RAM (random access memory) 43, a CPU (microprocessor) 44, an input port 45, and an output port 46 all connected by a bidirectional bus 41. The output signals of the air flow meter 8, temperature sensors 28a, 28b, 30a, 30b, differential pressure sensors 29a, 29b, and air-fuel ratio sensor 31a, 31b are input through the corresponding AD converters 47 to the input port 45. Further, the accelerator pedal 49 is connected to a load sensor 50 generating an output voltage proportional to the amount of depression L of the accelerator pedal 49. The output voltage of the load sensor 50 is input through the corresponding AD converter 47 to the input port 45. Further, the input port 45 is connected to a crank angle sensor 51 generating an output pulse for each rotation of the crankshaft by for example 15°. On the other hand, the output port 46 is connected through the corresponding drive circuits 48 to the fuel injector 3, throttle valve 10 drive system, EGR control valve 13, fuel pump 17, actuators 27a, 27b, and fuel addition valve 32.

Figure 2:
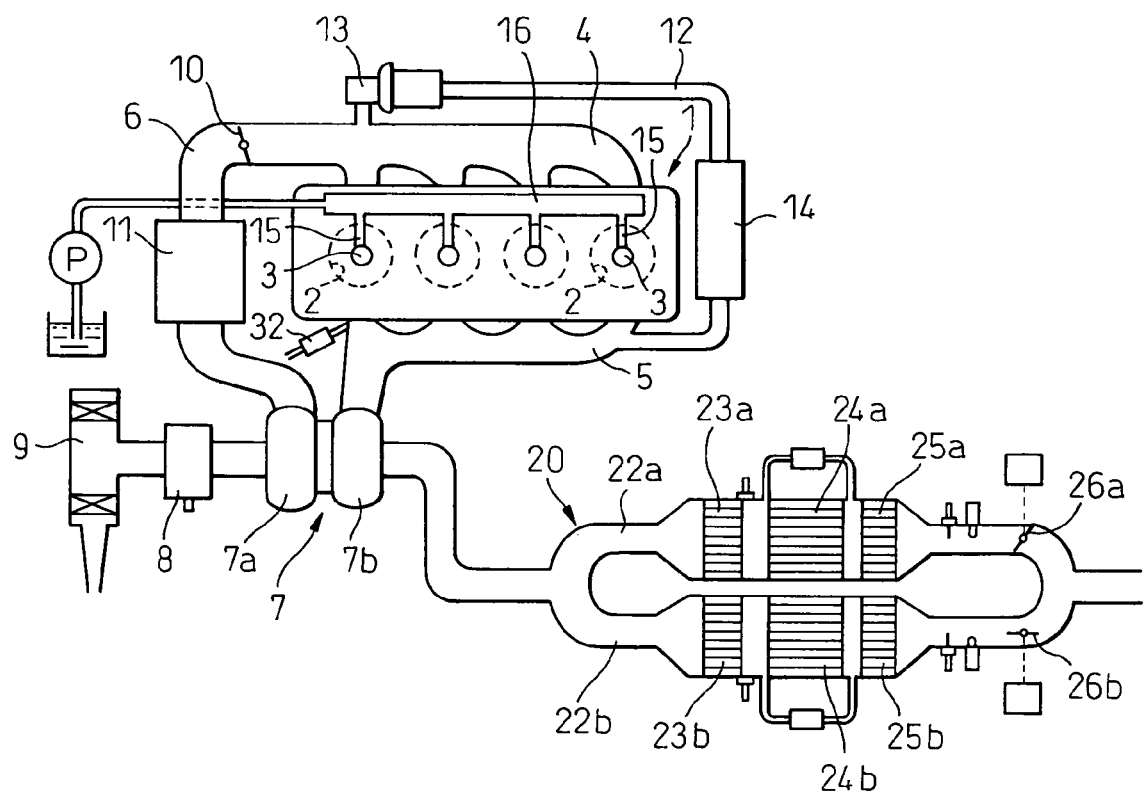
FIG. 2 is an overview of another embodiment of a compression ignition type internal combustion engine.

FIG. 2 shows another embodiment of a compression ignition type internal combustion engine. In this embodiment, the exhaust manifold 5 is provided with a fuel addition valve 32. This fuel addition valve 32 adds fuel, that is, diesel oil, into the exhaust manifold 5.

Figure 3:
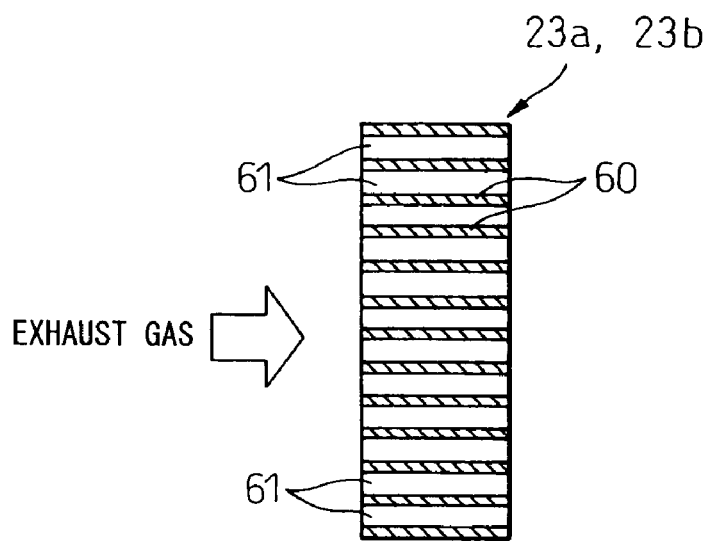
FIG. 3 is a side cross-sectional view of an NOx storing reduction catalyst.
Figure 4:
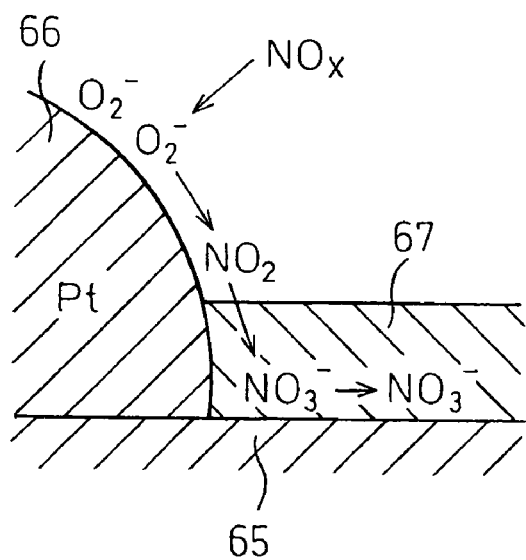
FIGS. 4(A) and 4(B) are cross-sectional views of a surface part of a catalyst carrier, FIGS. 5(A) and(B) are views of the structure of a particulate filter.
Figure 4:
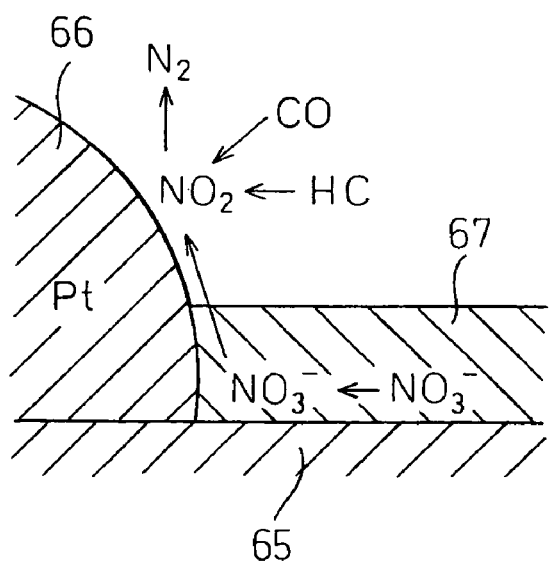

FIG. 3 shows the structure of the NOx storing reduction catalysts 23a, 23b. In the embodiment shown in FIG. 3, the NOx storing reduction catalysts 23a, 23b form honeycomb structures and are provided with a plurality of exhaust gas flow passages 61 separated from each other by thin partition walls 60. The partition walls 60 carry for example a catalyst carrier comprised of alumina on their two surfaces. FIGS. 4(A) and (B) schematically show the cross-section of the surface part of this catalyst carrier 65. As shown in FIGS. 4(A) and (B), the catalyst carrier 65 carries a precious metal catalyst 66 dispersed on its surface. Further, the catalyst carrier 65 is formed with a layer of an NOx absorbent 67 on its surface.

In the embodiment according to the present invention, as the precious metal catalyst 66, platinum Pt is used, while as the ingredient forming the NOx absorbent 67, for example, at least one ingredient selected from an alkali metal such as potassium K, sodium Na, or cesium Cs, an alkali earth such as barium Ba or calcium Ca, and a rare earth such as lanthanum La or yttrium Y may be used.

If the ratio of the air and fuel (hydrocarbons) supplied in the engine intake passage, combustion chamber 2, and exhaust passage upstream of the NOx storing reduction catalysts 23a, 23b is called the "air-fuel ratio of the exhaust gas", the NOx absorbent 67 performs an NOx absorption and release action of absorbing the NOx when the air-fuel ratio of exhaust gas is a lean air-fuel ratio and releasing the absorbed NOx when the oxygen concentration in the exhaust gas falls.

That is, explaining this taking as an example the case of use of barium Ba as the ingredient forming the NOx absorbent 67, when the air-fuel ratio of exhaust gas is a lean air-fuel ratio, that is, when the oxygen concentration in the exhaust gas is high, the NO contained in the exhaust gas, as shown in FIG. 4(A), is oxidized on the platinum Pt 66 and becomes $NO_2$ which is then absorbed in the NOx absorbent 67 and, while bonding with the barium oxide BaO, diffuses in the NOx absorbent 67 in the form of nitrate ions $NO_3^-$. In this way, NOx is absorbed in the NOx absorbent 67. So long as the oxygen concentration in the exhaust gas is high, $NO_2$ is formed on the surface of the platinum Pt 66. So long as the NOx absorption ability of the NOx absorbent 67 is not saturated, the $NO_2$ is absorbed in the NOx absorbent 67 and nitrate ions $NO_3^-$ are produced.

As opposed to this, if the air-fuel ratio of the exhaust gas is made a rich or stoichiometric air-fuel ratio, the oxygen concentration in the exhaust gas falls, so the reaction proceeds in the opposite direction ($NO_3^- \rightarrow NO_2$). Therefore, as shown in FIG. 4(B), the nitrate ions $NO_3^-$ in the NOx absorbent 67 are released in the form of $NO_2$ from the NOx absorbent 67. Next, the released NOx is reduced by the unburned HC and CO contained in the exhaust gas.

In this way, when the air-fuel ratio of the exhaust gas is lean, that is, when combustion is performed under a lean air-fuel ratio, the NOx in the exhaust gas is absorbed in the NOx absorbent 67. However, if combustion is continued under a lean air-fuel ratio, during that time the NOx absorption ability of the NOx absorbent 67 will end up becoming saturated and therefore the NOx absorbent 67 will end up no longer able to absorb NOx.

Therefore, in the embodiment according to the present invention, by adding fuel from the fuel addition valve 32 before the absorption ability of the NOx absorbent 67 becomes saturated, the air-fuel ratio of the exhaust gas is temporarily made rich and thereby the NOx absorbent 67 releases NOx.

Figure 5:
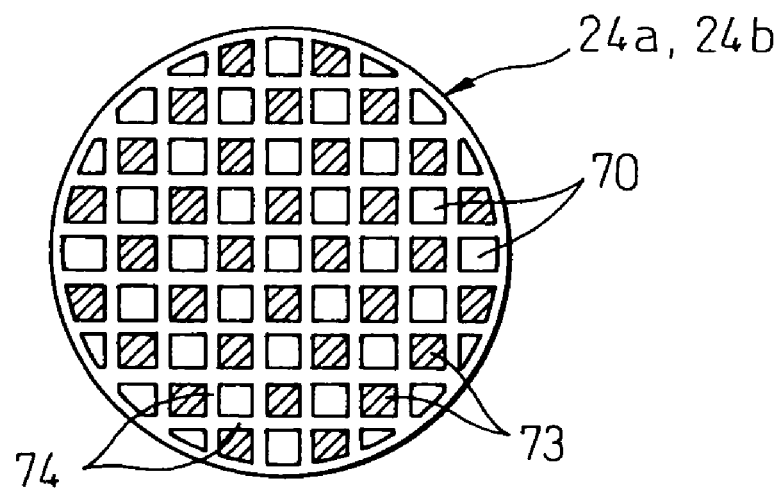
Figure 5:
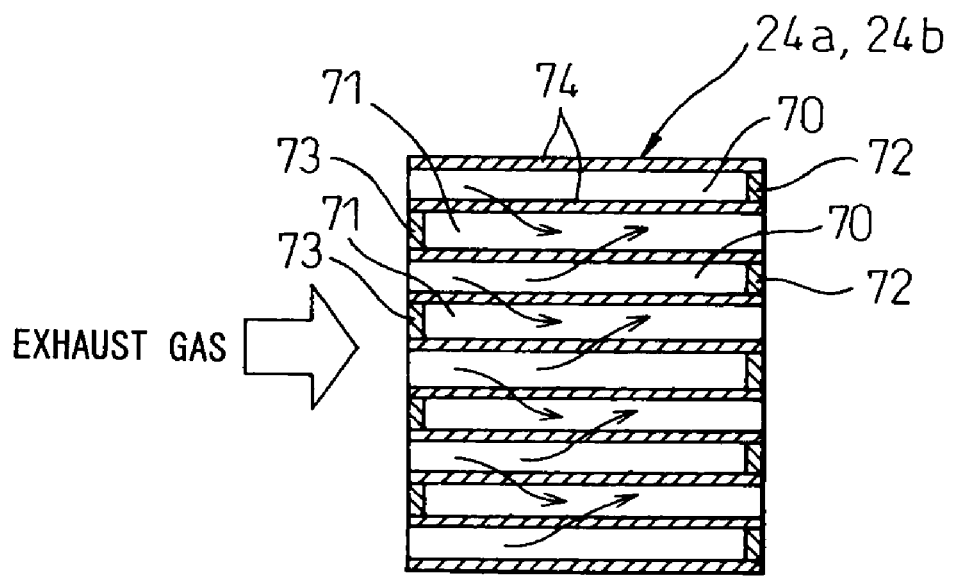

On the other hand, FIGS. 5(A) and (B) show the structures of the particulate filters 24a, 24b. Note that FIG. 5(A) is a front view of the particulate filters 24a, 24b, while FIG. 5(B) is a side cross-sectional view of the particulate filters 24a, 24b. As shown in FIGS. 5(A) and (B), the particulate filters 24a, 24b form honeycomb structures and are provided with a plurality of exhaust flow passages 70, 71 extending in parallel to each other. These exhaust flow passages are comprised of exhaust gas inflow passages 70 with downstream ends blocked by the plugs 72 and exhaust gas outflow passages 71 with upstream ends blocked by the plugs 73. Note that in FIG. 5(A), the hatched parts show the plugs 73. Therefore, the exhaust gas inflow passages 70 and exhaust gas outflow passages 71 are arranged alternately via thin partition walls 74. In other words, the exhaust gas inflow passages 70 and exhaust gas outflow passages 71 are arranged so that each exhaust gas inflow passage 70 is surrounded by four exhaust gas outflow passages 71 and each exhaust gas outflow passage 71 is surrounded by four exhaust gas inflow passages 70.

The particulate filters 24a, 24b are for example formed by a porous material such as cordierite. Therefore, the exhaust gas flowing into an exhaust gas inflow passage 70, as shown by the arrows in FIG. 5(B), passes through the surrounding partition walls 74 and flows out into the adjoining exhaust gas outflow passages 71.

In this embodiment according to the present invention, the peripheral wall surfaces of the exhaust gas inflow passages 70 and the exhaust gas outflow passages 71, that is, the two surfaces of the partition walls 74 and the inside wall surfaces of the pores inside the partition walls 74, carry a catalyst carrier comprised of for example alumina. This catalyst carrier 65 carries a precious metal catalyst 66 comprised of platinum Pt dispersed on its surface as shown in FIGS. 4(A) and (B) and is formed with layer of an NOx absorbent 67.

Therefore, when combustion is performed under a lean air-fuel ratio, the NOx in the exhaust gas is also absorbed in the NOx absorbent 67 on the particulate filters 24a, 24b. The NOx absorbed in this NOx absorbent 67 is also released by addition of fuel from the fuel addition valve 32.

On the other hand, the particulate matter contained in exhaust gas is trapped on the particulate filters 24a, 24b and successively oxidized. However, if the amount of the trapped particulate matter becomes greater than the amount of the oxidized particulate matter, the particulate matter gradually deposits on the particulate filters 24a, 24b. In this case, if the amount of the particulate matter deposited increases, a drop in the engine output ends up being invited. Therefore, when the amount of the deposited particulate matter increases, the deposited particulate matter must be removed. In this case, if raising the temperature of the particulate filters 24a, 24b under an excess of air to 600° C. or so, the deposited particulate matter is oxidized and removed.

Therefore, in this embodiment according to the present invention, when the amount of the particulate matter deposited on the particulate filters 24a, 24b exceeds the allowable amount, that is, the differential pressure $\Delta P$ before and after the particulate filter 24a, 24b detected by the differential pressure sensors 29a, 29b exceeds the allowable value, the air-fuel ratio of the exhaust gas flowing into the particulate filters 24a, 24b is maintained, fuel is added from the fuel addition valve 32, and the heat of oxidation reaction of the fuel added is used to raise the temperature of the particulate filters 24a, 24b, whereby the deposited particulate matter is removed by oxidation.

Note that in FIG. 1, the NOx storing reduction catalysts 23a, 23b can be eliminated. Further, in FIG. 1, as the particulate filters 24a, 24b, particulate filters not carrying an NOx absorbent 67 may be used. However, an NOx absorbent 67 must be arranged in both of the first exhaust passage 22a and second exhaust passage 22b.

Next, referring to FIG. 6, control for release of NOx from the NOx absorbent 67 on the NOx storing reduction catalysts 23a, 23b and from the NOx absorbent 67 on the particulate filters 24a, 24b will be explained.

The amount of NOx exhausted from an engine per unit time changes in accordance with the operating state of the engine. Therefore, the amount of NOx absorbed in an NOx absorbent 67 per unit time also changes in accordance with the operating state of the engine. In the embodiment according to the present invention, the NOx amount NOXA absorbed in the NOx absorbent 67 per unit time is stored as a function of the required torque TQ and engine speed N in the form of a map shown in FIG. 7 in advance in the ROM 42. By cumulatively adding this NOx amount NOXA, the NOx amount $\Sigma NOX$ absorbed in the NOx absorbent 67 is calculated.

In the embodiment according to the present invention, the NOx release action is performed alternately from the NOx absorbent 67 in the first exhaust passage 22a and the NOx absorbent 67 in the second exhaust passage 22b. When the NOx amount $\Sigma NOX$ absorbed in an NOx absorbent 67 reaches the allowable value MAX shown in FIG. 6, the NOx absorption amount of the NOx absorbent 67 in one of the exhaust passages 22a, 22b reaches the allowable value. Therefore, at this time, it is judged that NOx should be released from the NOx absorbent 67 reaching the allowable value. At this time, the NOx amount absorbed in the other NOx absorbent 67 is half of the allowable value. Note that in FIG. 6, X1 shows when the NOx absorption amount of the NOx absorbent 67 in the first exhaust passage 22a reaches the allowable value, while X2 shows when the NOx absorption amount of the NOx absorbent 67 in the second exhaust passage 22b reaches the allowable value.

Figure 6:
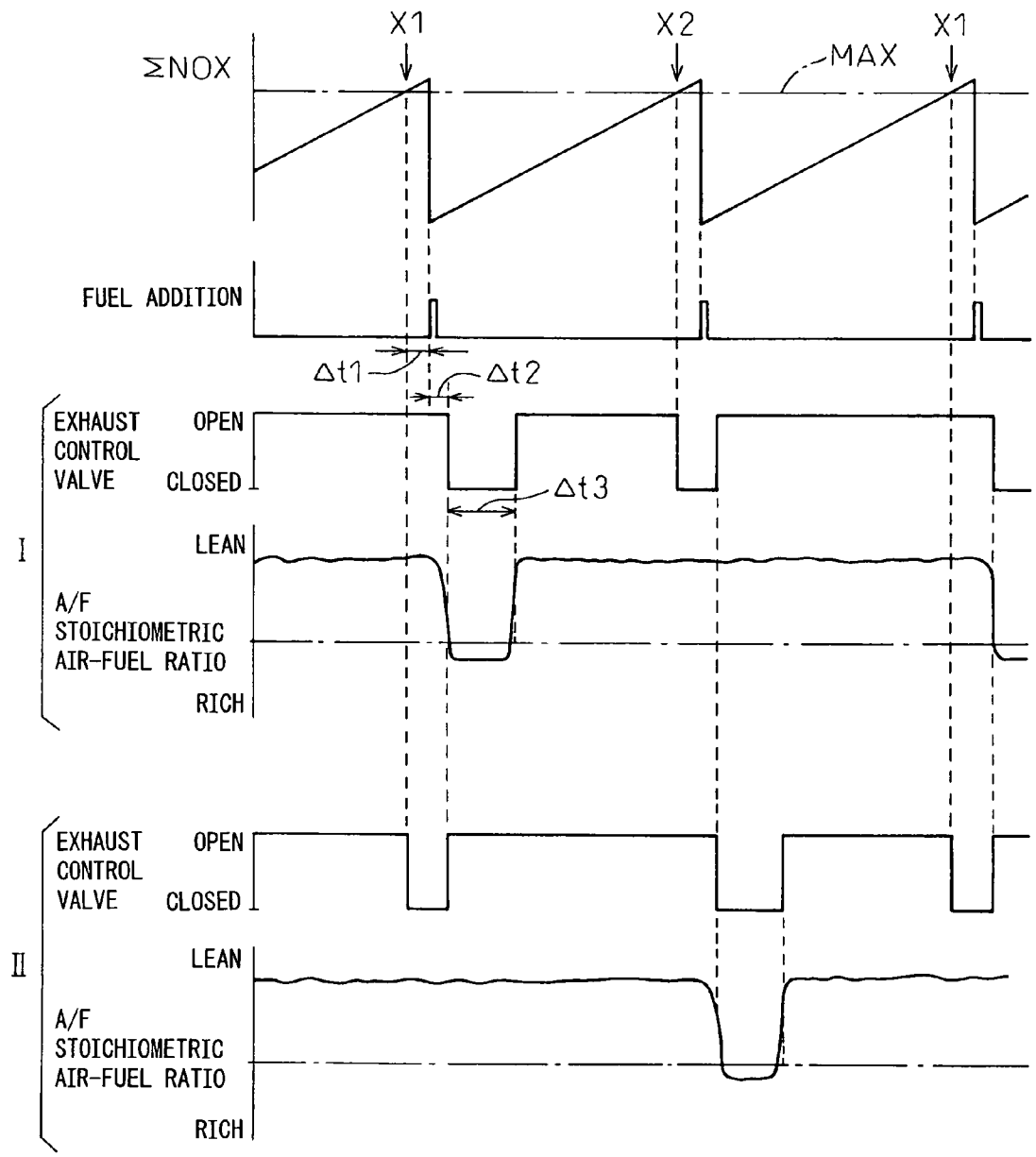
FIG. 6 is a time chart showing the timing of addition of fuel and the opening/closing timing of an exhaust control valve.

On the other hand, in FIG. 6, I indicates a first exhaust passage 22a, while II indicates a second exhaust passage 22b. As will be understood from FIG. 6, normally, that is, when the NOx amount $\Sigma NOX$ is lower than the allowable value MAX, both the first exhaust control valve 26a and second exhaust control valve 26b are opened and exhaust gas of a lean air-fuel ratio circulates through both of the first exhaust passage 22a and second exhaust passage 22b. Therefore, at this time, the absorption action of the NOx in the exhaust gas is performed in the NOx absorbent 67 in one of the exhaust passages 22a, 22b.

Now, as shown by X1 in FIG. 6, when NOx should be released from the NOx absorbent 67 provided in the first exhaust passage 22a, first, the second exhaust control valve 26b is closed, whereby the second exhaust passage 22b is closed. As a result, the exhaust gas circulating through the common exhaust passage 21 flows into only the first exhaust passage 22a. Next, the second exhaust passage 22b is closed, then, when a predetermined first time $\Delta t1$ elapses, fuel is added from the fuel addition valve 32. At this time, as explained above, the exhaust gas flows into only the first exhaust passage 22a, so the fuel added from the fuel addition valve 32, that is, the diesel oil, also flows into only the first exhaust passage 22a. Note that the first time corresponds to the wait time until the flow of exhaust gas into the second exhaust passage 22b stops.

On the other hand, when the predetermined second time Δt2 elapses after fuel is added, the second exhaust control valve 26b is opened, the second exhaust passage 22b is opened, the first exhaust control valve 26a is closed, and the first exhaust passage 22a is closed. That is, when fuel is added from the fuel addition valve 32, the fuel does not ride the flow of exhaust gas and immediately run through the first exhaust passage 22a, but proceeds through the inside of the first exhaust passage 22a delayed with respect to the flow of the exhaust gas. Next, this fuel sticks once on the NOx storing reduction catalyst 23a, the particulate filter 24a, and the oxidation catalyst 25a in the first exhaust passage 22a, then evaporates.

That is, if the first exhaust control valve 26a is closed too early after the fuel is added from the fuel addition valve 32, the added fuel will not proceed to the front of the first exhaust passage 22a and the added fuel cannot be held by sufficiently utilizing the surface of the NOx storing reduction catalyst 23a or particulate filter 24a. As opposed to this, the slower the first exhaust control valve 26a is closed after the fuel is added, the more the evaporated fuel ends up being exhausted to the outside. That is, the second time Δt2 is the time required for holding the fuel added from the fuel addition valve 32 in the first exhaust passage 22a.

Figure 8:
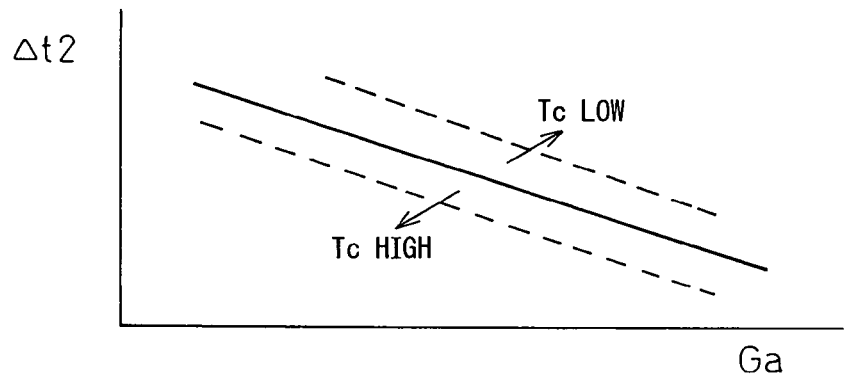
Figure 8:
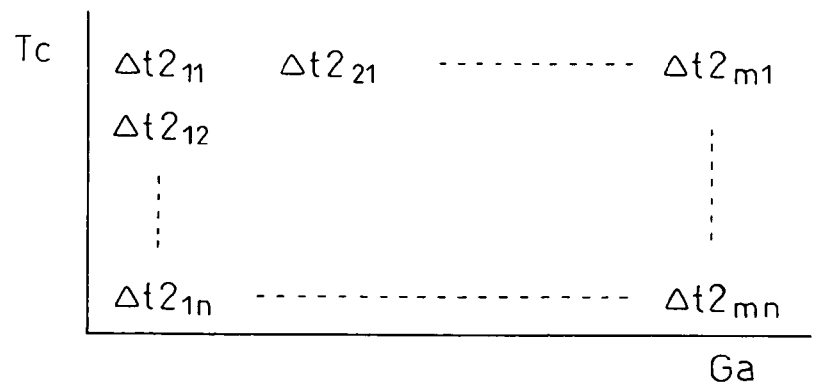

In this case, the faster the flow rate of the exhaust gas, that is, the greater the intake air amount, the further the added fuel proceeds, so the greater the intake air amount, the faster the first exhaust control valve 26a must be closed. Therefore, as shown by the solid line in FIG. 8(A), the greater the intake air amount Ga, the shorter the second time Δt2 is made. On the other hand, the higher the temperature Tc of the NOx storing reduction catalyst 23a or particulate filter 24a, that is, the temperature Tc of the NOx absorbent 67, the easier it is for the stuck fuel to evaporate, so as shown by FIG. 8(A), the higher the temperature Tc, the shorter the second time Δt2 is made. This second time Δt2 is stored as a function of the intake air amount Ga and temperature Tc in the form of a map as shown in FIG. 8(B) in advance in the ROM 42.

On the other hand, when the predetermined third time Δt3 elapses after the first exhaust control valve 26a is closed and the first exhaust passage 22a is closed, the first exhaust control valve 26a is opened and the first exhaust passage 22a is opened. While the first exhaust control valve 26a is closed, the fuel stuck to the NOx storing reduction catalyst 23a and particulate filter 24a evaporates and the exhaust gas standing in the first exhaust passage 22a becomes a rich air-fuel ratio, whereby the NOx absorbed in the NOx absorbent 67 is released and reduced. Therefore, the third time Δt3 is the time during which the exhaust gas in the first exhaust passage 22a can be held at a rich air-fuel ratio.

Figure 9:
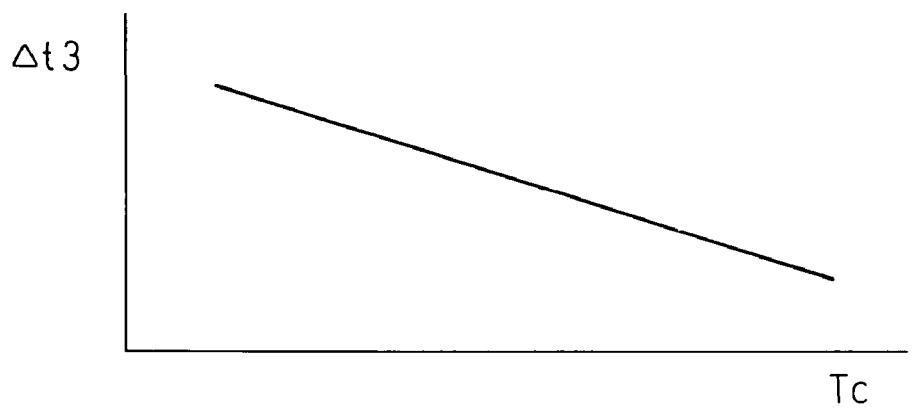
Figure 9:
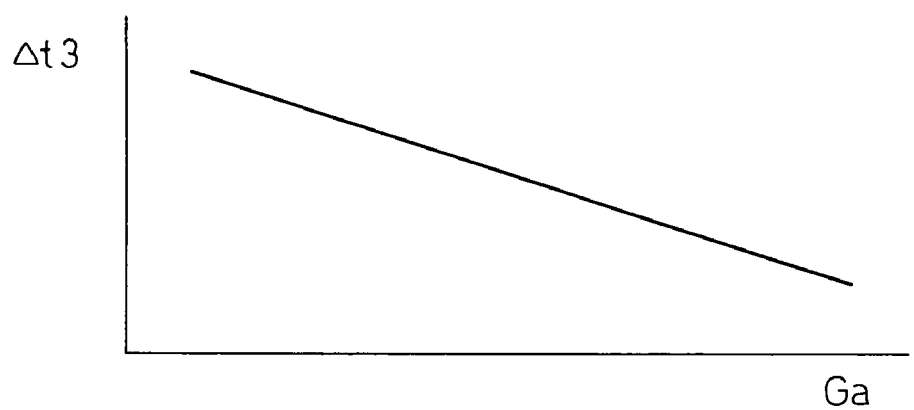
Figure 9:
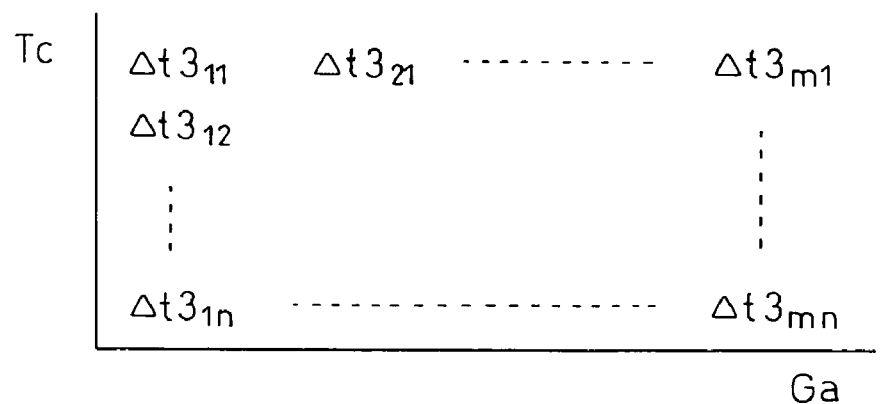

The higher the NOx absorbent 67 in the temperature Tc, the more the NOx release and reduction action progresses, so as shown in FIG. 9(A), the higher the temperature Tc, the shorter the third time Δt3 becomes. Further, even if the exhaust control valves 26a, 26b fully close, there may be some leakage. If there is such leakage, the lean air-fuel ratio exhaust gas flows into the first exhaust passage 22a, so the exhaust gas in the first exhaust passage 22a switches early from a rich to lean air-fuel ratio. In this case, the greater the exhaust gas amount, that is, the greater the intake air amount Ga, the earlier the switch from rich to lean, so as shown in FIG. 9(B), the greater the intake air amount Ga, the shorter the third time Δt3 is made. This third time Δt3 is stored as a function of the intake air amount Ga and temperature Tc in the form of a map as shown in FIG. 9(C) in advance in the ROM 42.

As shown by X2 in FIG. 6, the same is true when NOx should be released from the NOx absorbent 67 provided in the second exhaust passage 22b. That is, when NOx should be released from the NOx absorbent 67 provided in the second exhaust passage 22b, the first exhaust passage 22a is closed, then when the predetermined first time Δt1 elapses, the fuel addition valve 32 adds fuel. After the fuel is added, when the predetermined second time Δt2 elapses, the first exhaust passage 22a is opened and the second exhaust passage 22b is closed. Next, after the predetermined third time Δt3 elapses, the second exhaust passage 22b is opened.

Therefore, in the present invention, expressed conceptually, when NOx should be released from the NOx absorbent 67 provided in the first exhaust passage 22a, the second exhaust passage 22b is closed and the first exhaust passage 22a is opened, the fuel addition valve 32 adds fuel in that state, the added fuel is guided into the first exhaust passage 22a, and after the fuel is guided into the first exhaust passage 22a, the first exhaust passage 22a is closed so as to maintain the air-fuel ratio of the exhaust gas in the first exhaust passage 22a rich using this fuel. When NOx should be released from the NOx absorbent 67 provided in the second exhaust passage 22b, the first exhaust passage 22a is closed and the second exhaust passage 22b is opened, the fuel addition valve 32 adds fuel in that state, the added fuel is guided into the second exhaust passage 22b, and after the fuel is guided into the second exhaust passage 22b, the second exhaust passage 22b is closed so as to maintain the air-fuel ratio of the exhaust gas in the second exhaust passage 22b rich using this fuel.

Figure 10:
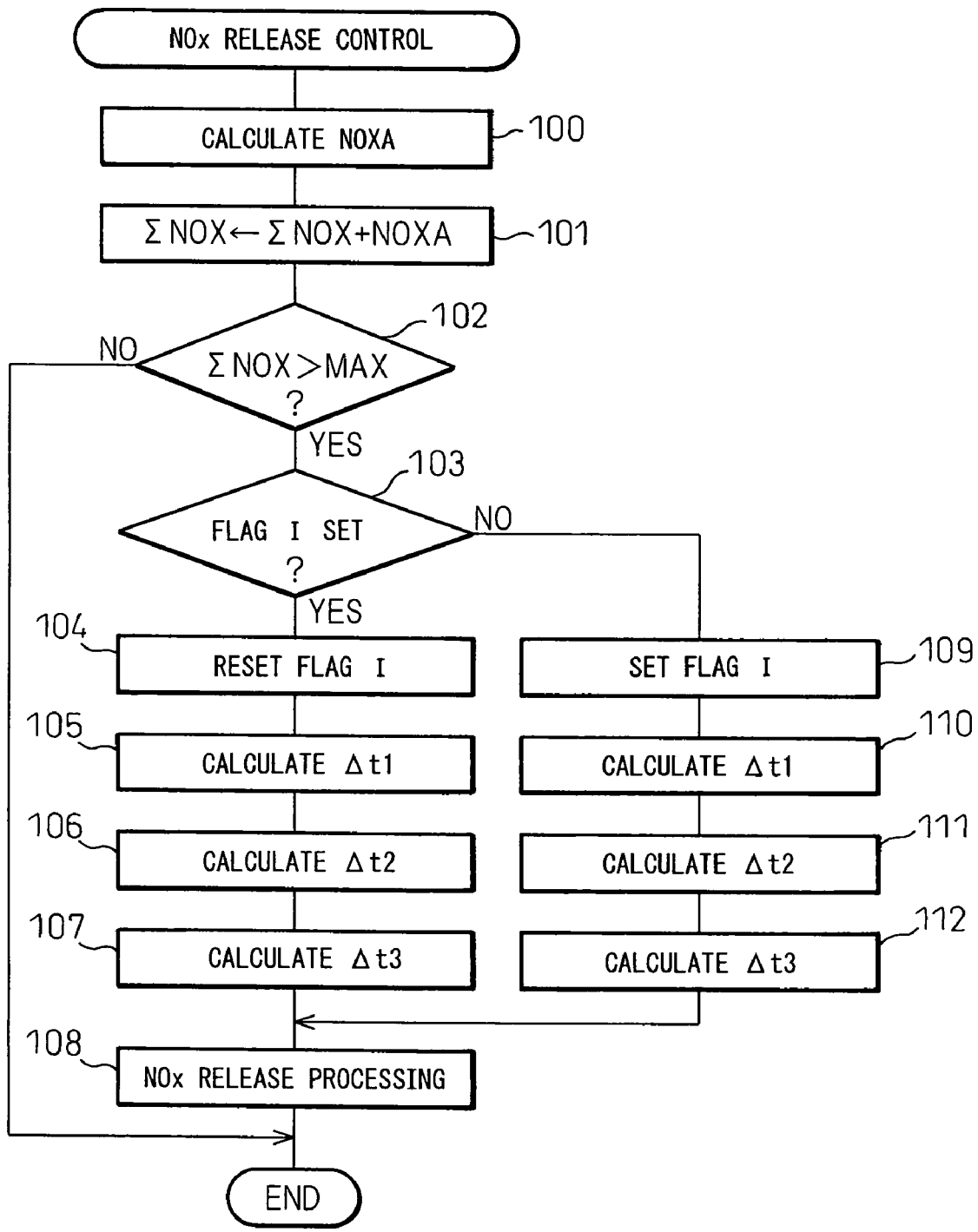
FIG. 10 is a flow chart of NOx release control, FIGS. 11(A), (B) and (C) are views of various modifications of a compression ignition type internal combustion engine, and FIGS. 12(A), (B) and (C) are views of various modifications of a compression ignition type internal combustion engine.

FIG. 10 shows the NOx release control routine.

Figure 7:
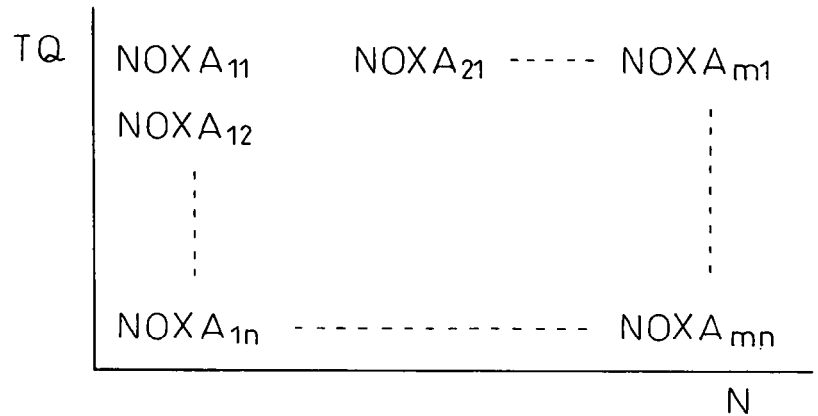
FIG. 7 is a view of a map of the absorbed NOx amount NOXA, FIGS. 8(A) and (B) are views of a second time $\Delta t2$, FIGS. 9(A),(B) and (C) are views of a third time $\Delta t3$.

Referring to FIG. 10, first, at step 100, the NOx amount NOXA absorbed per unit time is calculated from the map shown in FIG. 7. Next, at step 101, this NOXA is added to the NOx amount ΣNOX absorbed in the NOx absorbent 67. Next, at step 102, it is judged whether the absorbed NOx amount ΣNOX exceed the allowable value MAX. When ΣNOX>MAX, the routine proceeds to step 103, where it is judged whether the flag I showing that the NOx absorbent 67 in the first exhaust passage 22a should release NOx has been set.

When it is judged at step 103 that the flag I has been set, that is, when the NOx absorbent 67 in the first exhaust passage 22a should release NOx, the routine proceeds to step 104, where the flag I is reset. Next, at step 105, the first time Δt1 is calculated. Next, at step 106, the representative temperature Tc of the NOx storing reduction catalyst 23a and particulate filter 24a estimated from one or both of the temperatures detected by the temperature sensor 28a and temperature sensor 30a and the intake air amount Ga detected by the air flow meter 8 are used to calculate the second time Δt2 from the map shown in FIG. 8(B). Next, at step 107, the representative temperature Tc of the NOx storing reduction catalyst 23a and particulate filter 24a estimated from one or both of the temperatures detected by the temperature sensor 28a and temperature sensor 30a and the intake air amount Ga detected by the air flow meter 8 are used to calculate the third time Δt3 from the map shown in FIG. 9(C). Next, the routine proceeds to step 108.

At step 108, as shown in FIG. 6, first, the second exhaust control valve 26b is closed. Next, when the first time Δt1 calculated at step 105 elapses, the fuel addition valve 32 adds fuel, that is, diesel oil, and the NOx amount ΣNOX is made zero. Next, when the second time Δt2 calculated at step 106 elapses, the first exhaust control valve 26a is closed and the second exhaust control valve 26b is opened. Next, when the third time Δt3 calculated at step 107 elapses, the first exhaust control valve 26a is opened.

On the other hand, when it is judged at step 103 that the flag I is not set, that is, when the NOx absorbent 67 in the second exhaust passage 22b should release NOx, the routine proceeds to step 109 where the flag I is set. Next, at step 110, the first time Δt1 is calculated. Next, at step 111, the representative temperature Tc of the NOx storing reduction catalyst 23b and particulate filter 24b estimated from one or both of the temperatures detected by the temperature sensor 28b and temperature sensor 30b and the intake air amount Ga detected by the air flow meter 8 are used to calculate the second time Δt2 from the map shown in FIG. 8(B). Next, at step 112, the representative temperature Tc of the NOx storing reduction catalyst 23b and particulate filter 24b estimated from one or both of the temperatures detected by the temperature sensor 28b and temperature sensor 30b and the intake air amount Ga detected by the air flow meter 8 are used to calculate the third time Δt3 from the map shown in FIG. 9(C). Next, the routine proceeds to step 108.

At step 108, as shown in FIG. 6, first, the first exhaust control valve 26a is closed. Next, when the first time Δt1 calculated at step 110 elapses, the fuel addition valve 32 adds fuel, that is, diesel oil, and the NOx amount ΣNOX is made zero. Next, when the second time Δt2 calculated at step 111 elapses, the second exhaust control valve 26b is closed and the first exhaust control valve 26a is opened. Next, when the third time Δt3 calculated at step 112 elapses, the second exhaust control valve 26b is opened.

As explained above, in the example shown in FIG. 10, when the third time Δt3 found from the map elapses, the first exhaust control valve 26a or the second exhaust control valve 26b is opened. However, it is also possible not to use the map of the third time Δt3 and to open the first exhaust control valve 26a of the second exhaust control valve 26b when the air-fuel ratio of the exhaust gas detected by the air-fuel ratio sensors 31a, 31b switches from rich to lean.

Further, there is resistance to laying a fuel feed pipe for adding fuel to a fuel addition valve 32 over a long distance under the floor of a vehicle. However, in the present invention, as shown in FIG. 1, a fuel addition valve 32 can be arranged in the exhaust passage 21 immediately downstream of the exhaust turbine 7b, so the fuel feed pipe can be shortened. In the example shown in FIG. 2, the fuel feed pipes can be made further shorter.

FIGS. 11(A) to (C) and FIGS. 12(A) to (C) show various modifications.

Figure 11:
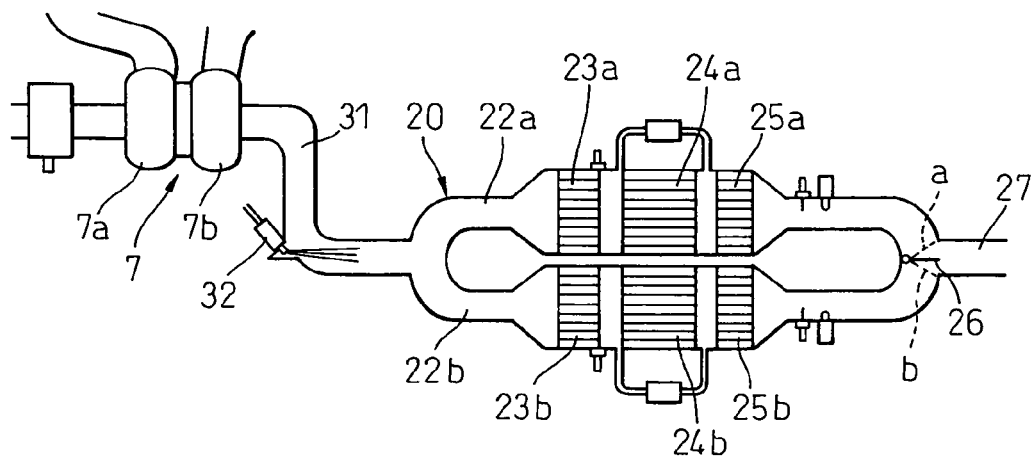
Figure 11:
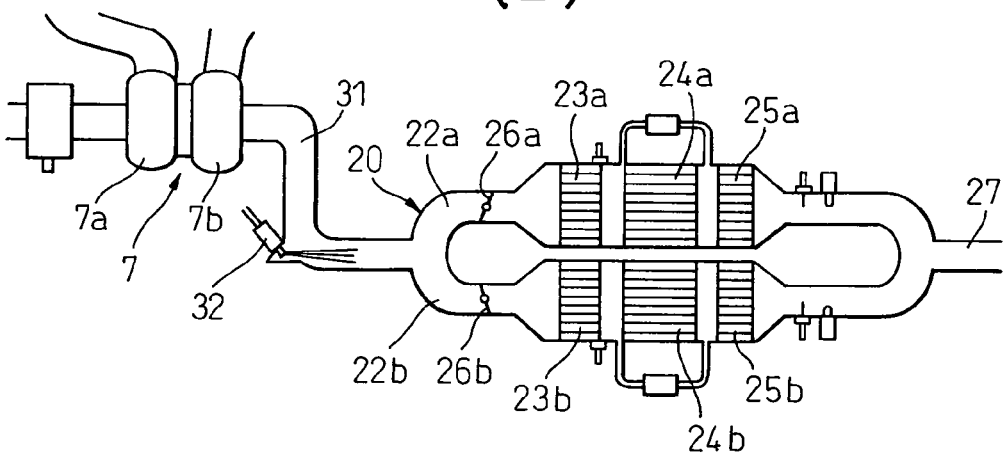
Figure 11:
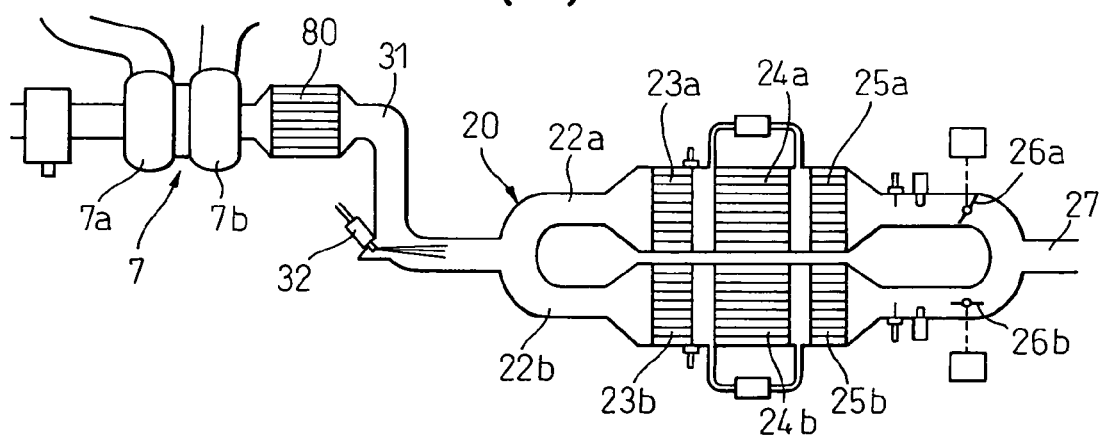

In the example shown in FIG. 11(A), at the part where the downstream end of the first exhaust passage 22a and the downstream end of the second exhaust passage 22b merge into the exhaust passage 27, a single exhaust control valve 26 is arranged. This single exhaust control valve 26 is used to switch to three states of a state as shown by the solid line where the first exhaust passage 22a and the second exhaust passage 22b are both open, a state as shown by the broken line a where only the first exhaust passage 22a is closed, and a state as shown by the broken line b where only the second exhaust passage 22b is closed.

In the example shown in FIG. 11(b), a first exhaust control valve 26a is arranged in the first exhaust passage 22a upstream of the first NOx storing reduction catalyst 23a, while a second exhaust control valve 26b is arranged in the second exhaust passage 22b upstream of the second NOx storing reduction catalyst 23b. In this case as well, when the added fuel sticks to the first NOx storing reduction catalyst 23a and first particulate filter 24a, if closing the first exhaust control valve 26a, the exhaust gas in the first exhaust passage 22a is held rich, while when the added fuel sticks to the second NOx storing reduction catalyst 23b and second particulate filter 24b, if closing the second exhaust control valve 26b, the exhaust gas of the second exhaust passage 22b is held rich.

In the example shown in FIG. 11(C), to promote the warmup of the NOx storing reduction catalysts 23a, 23b and particulate filters 24a, 24b, an oxidation catalyst 80 is arranged in the common exhaust passage 31.

Alternatively, to protect the NOx absorbents 67 from sulfur poisoning, a sulfur trap catalyst 80 for trapping the sulfur contained in the exhaust gas is arranged in the exhaust passage 31 upstream of the fuel addition valve 32. Further, at the time of engine startup, combustion gas of a combustion type heater used for raising the cooling water temperature early is introduced into the exhaust passage 31 to promote the warmup of the NOx storing reduction catalysts 23a, 23b and particulate filters 24a, 24b.

Figure 12:
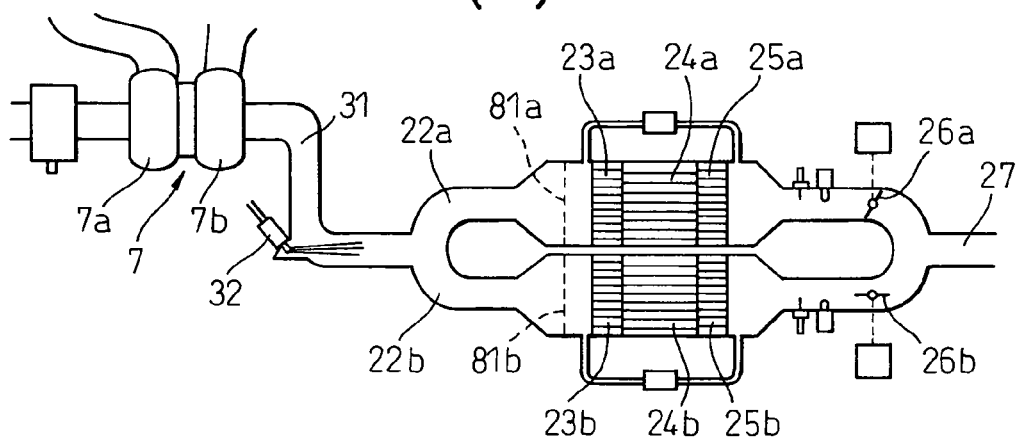
Figure 12:
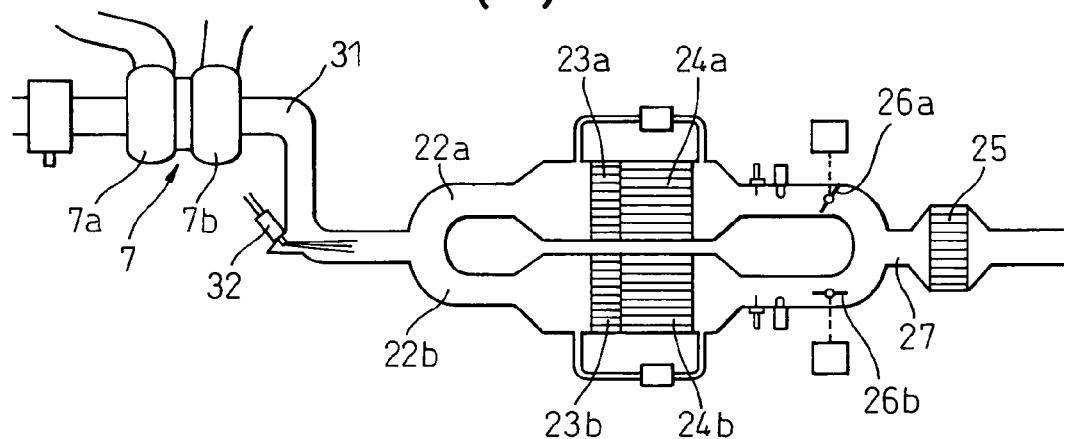
Figure 12:
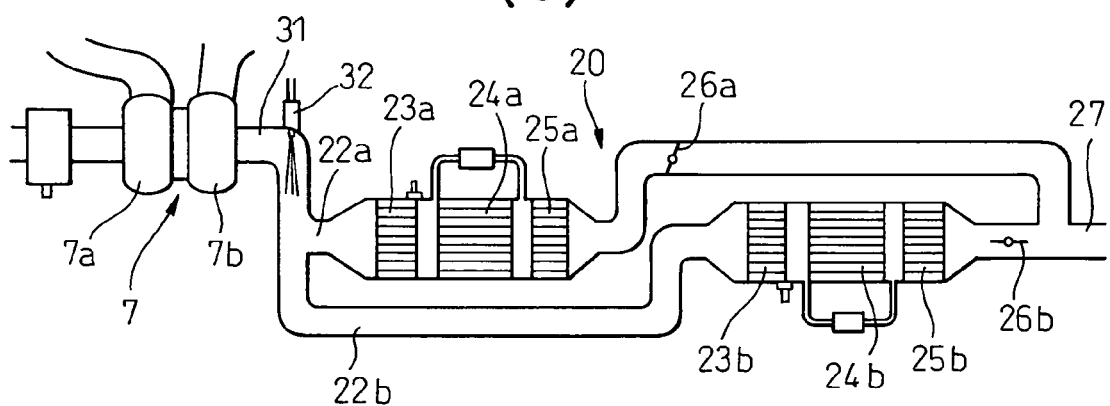

In the example shown in FIG. 12(A), the first NOx storing reduction catalyst 23a, first particulate filter 24a, and first oxidation catalyst 25a are provided in a single casing in close contact with each other. Similarly, the second NOx storing reduction catalyst 23b, second particulate filter 24b, and second oxidation catalyst 25b are provided in a single casing in close contact with each other. Further, in this example, to enable the added fuel to be uniformly distributed inside the NOx storing reduction catalysts 23a, 23b and particulate filters 24a, 24b, the exhaust passages 22a, 22b upstream of the NOx storing reduction catalysts 23a, 23b are provided with porous plates 81a, 81b formed with large numbers of holes.

In the example shown in FIG. 12(B), the first NOx storing reduction catalyst 23a and first particulate filter 24a are arranged in a single casing in close contact with each other, the second NOx storing reduction catalyst 23b and second particulate filter 24b are arranged in a single casing in close contact with each other, and a common oxidation catalyst 25 is arranged in a common exhaust passage 27.

In the example shown in FIG. 12(C), the second NOx storing reduction catalyst 23b, second particulate filter 24b, and second oxidation catalyst 25b arranged in the second exhaust passage 22b are arranged in series with respect to the first NOx storing reduction catalyst 23a, first particulate filter 24a, and first oxidation catalyst 25a arranged in the first exhaust passage 22a.

LIST OF REFERENCE NUMERALS

5 . . . exhaust manifold
20 . . . exhaust after-treatment device
21, 27 . . . common exhaust passage
22a . . . first exhaust passage
22b . . . second exhaust passage
23a . . . first NOx storing reduction catalyst
23b . . . second NOx storing reduction catalyst
24a . . . first particulate filter
24b . . . second particulate filter
25a . . . first oxidation catalyst
25b . . . second oxidation catalyst
26a . . . first exhaust control valve
26b . . . second exhaust control valve
32 . . . fuel addition valve

The invention claimed is:

1. An exhaust purification device of an internal combustion engine provided with a first exhaust passage and a second exhaust passage branched from a common exhaust passage and providing an NOx absorbent storing NOx in an exhaust gas when the air-fuel ratio of inflowing exhaust gas is a lean air-fuel ratio and releasing stored NOx when the air-fuel ratio of inflowing exhaust gas is a rich air-fuel ratio in each of the first exhaust passage and second exhaust passage, wherein a fuel addition valve is arranged in said common exhaust passage upstream of the first exhaust passage and second exhaust passage and, when NOx should be released from the NOx absorbent arranged in the first exhaust passage, fuel added from the fuel addition valve is guided into the first exhaust passage and, after the fuel is guided into the first exhaust passage, the first exhaust passage is closed so as to maintain the air-fuel ratio of the exhaust gas in the first exhaust passage rich by using this fuel and, when NOx should be released from the NOx absorbent arranged in the second exhaust passage, fuel added from the fuel additional valve is guided into the second exhaust passage and, after the fuel is guided into the second exhaust passage, the second exhaust passage is closed so as to maintain the air-fuel ratio of the exhaust gas in the second exhaust passage rich by using this fuel, wherein, when the first exhaust passage is closed, the exhaust gas circulating through the common exhaust passage flows into only the second exhaust passage, and wherein, when the second exhaust passage is closed, the exhaust gas circulating through the common exhaust passage flows into only the first exhaust passage.

2. An exhaust purification device of an internal combustion engine as set forth in claim 1, wherein an NOx storing reduction catalyst carrying said NOx absorbent is arranged in each of the first exhaust passage and second exhaust passage.

3. An exhaust purification device of an internal combustion engine as set forth in claim 1, wherein a particulate filter carrying said NOx absorbent is arranged in each of the first exhaust passage and second exhaust passage.

4. An exhaust purification device of an internal combustion engine as set forth in claim 1, further provided with at least one exhaust control valve for closing or opening the first exhaust passage and second exhaust passage.

5. An exhaust purification device of an internal combustion engine as set forth in claim 1, which, when NOx should be released from the NOx absorbent arranged in the first exhaust passage, fuel is added from the fuel additional valve in a state where the second exhaust passage is closed and the first exhaust passage is open to guide the added fuel into the first exhaust passage and, after the fuel is guided into the first exhaust passage, the first exhaust passage is closed so as to maintain the air-fuel ratio of the exhaust gas in the first exhaust passage rich by using this fuel and, when NOx should be released from the NOx absorbent arranged in the second exhaust passage, fuel is added from the fuel additional valve in a state where the first exhaust passage is closed and the second exhaust passage is open to guide the added fuel into the second exhaust passage and, after the fuel is guided into the second exhaust passage, the second exhaust passage is closed so as to maintain the air-fuel ratio of the exhaust gas in the second exhaust passage rich by using this fuel.

6. An exhaust purification device of an internal combustion engine as set forth in claim 1, which, when NOx should not be released from the NOx absorbent, both the first exhaust passage and second exhaust passage are opened.

7. An exhaust purification device of an internal combustion engine as set forth in claim 6, which, when NOx should be released from the NOx absorbent arranged in the first exhaust passage, the second exhaust passage is closed, then, after the elapse of a predetermined first time, fuel is added from the fuel addition valve, then, when a predetermined second time elapses from when the fuel is added, the second exhaust passage is opened and the first exhaust passage is closed, then, when a predetermined third time elapses, the first exhaust passage is opened, and, when NOx should be released from the NOx absorbent arranged in the second exhaust passage, the first exhaust passage is closed, then, after the elapse of a predetermined first time, fuel is added from the fuel addition valve, then, when a predetermined second time elapses from when the fuel is added, the first exhaust passage is opened and the second exhaust passage is closed, then, when a predetermined third time elapses, the second exhaust passage is opened.

8. An exhaust purification device of an internal combustion engine as set forth in claim 7, wherein when NOx should be released from the NOx absorbent arranged in the first exhaust passage, said first time corresponds to a wait time until exhaust gas stops flowing into the second exhaust passage, and when NOx should be released from the NOx absorbent arranged in the second exhaust passage, said first time corresponds to a wait time until exhaust gas stops flowing into the first exhaust passage.

9. An exhaust purification device of an internal combustion engine as set forth in claim 7, wherein when NOx should be released from the NOx absorbent arranged in the first exhaust passage, said second time is the time required for holding the fuel added from the fuel addition valve in the first exhaust passage, and when NOx should be released from the NOx absorbent arranged in the second exhaust passage, said second time is the time required for holding the fuel added from the fuel addition valve in the second exhaust passage.

10. An exhaust purification device of an internal combustion engine as set forth in claim 9, wherein said second time is shorter the greater the intake air amount.

11. An exhaust purification device of an internal combustion engine as set forth in claim 9, wherein said second time is shorter the higher the temperature of the NOx absorbent.

12. An exhaust purification device of an internal combustion engine as set forth in claim 7, wherein:

when NOx should be released from the NOx absorbent arranged in the first exhaust passage, said third time is the time during which the exhaust gas in the first exhaust passage is maintained at a rich air-fuel ratio; and when NOx should be released from the NOx absorbent arranged in the second exhaust passage, said third time is the time during which the exhaust gas in the second exhaust passage is maintained at a rich air-fuel ratio.

13. An exhaust purification device of an internal combustion engine as set forth in claim 12, wherein said third time becomes shorter the greater the intake air amount.

14. An exhaust purification device of an internal combustion engine as set forth in claim 12, wherein said third time becomes shorter the higher the temperature of the NOx absorbent.

15. A method of exhaust purification for us in an internal combustion engine provided with a first exhaust passage and a second exhaust passage branched from a common exhaust passage, a fuel addition valve arranged in the common exhaust passage upstream of the first and second exhaust passages, and a NOx absorbent storing NOx in an exhaust gas when the air-fuel ratio of inflowing exhaust gas is a lean air-fuel ratio and releasing stored NOx when the air-fuel ratio of inflowing exhaust gas is a rich air-fuel ratio in each of the first exhaust passage and second exhaust passage, the method comprising the steps of:

guiding fuel from the fuel addition valve into the first exhaust passage when NOx should be released from the NOx absorbent arranged in the first exhaust passage;

closing the first exhaust passage after the fuel is guided into the first exhaust passage so as to maintain a rich air-fuel ratio of the exhaust gas in the first exhaust passage;

guiding fuel from the fuel addition valve into the second exhaust passage when NOx should be released from the NOx absorbent arranged in the second exhaust passage; and closing the second exhaust passage after the fuel is guided into the second exhaust passage so as to maintain a rich air-fuel ratio of the exhaust gas in the second exhaust passage, wherein, when the first exhaust passage is closed, the exhaust gas circulating through the common exhaust passage flows into only the second exhaust passage, and wherein, when the second exhaust passage is closed, the exhaust gas circulating through the common exhaust passage flows into only the first exhaust passage.

16. The method of claim 15, wherein a NOx storing reduction catalyst carrying said NOx absorbent is arranged in each of the first exhaust passage and second exhaust passage.

17. The method of claim 15, wherein a particulate filter carrying said NOx absorbent is arranged in each of the first exhaust passage and second exhaust passage.

18. The method of claim 15, wherein the internal combustion engine is further provided with at least one exhaust control valve for closing or opening the first exhaust passage and second exhaust passage.

19. The method of claim 15, wherein:

the guiding fuel from the fuel addition valve into the first exhaust passage occurs in a state where the second exhaust passage is closed and the first exhaust passage is open; and the guiding fuel from the fuel addition valve into the second exhaust passage occurs in a state where the first exhaust passage is closed and the second exhaust passage is open.

20. The method of claim 15, further comprising opening both the first and second exhaust passages when NOx should not be released from the NOx absorbent.

21. The method of claim 20, further comprising:

(a) when NOx should be released from the NOx absorbent arranged in the first exhaust passage:
   (1) closing the second exhaust passage; then, after the lapse of a first predetermined time,
   (2) adding fuel from the fuel addition valve; then, after the lapse of a second predetermined time,
   (3) opening the second exhaust passage and closing the first exhaust passage; and then, after the lapse of a third predetermined time,
   (4) opening the first exhaust passage; and (b) when NOx should be released from the NOx absorbent arranged in the second exhaust passage:
   (1) closing the first exhaust passage; then, after the lapse of the first predetermined time,
   (2) adding fuel from the fuel addition valve; then, when after the lapse of the second predetermined time,
   (3) opening the first exhaust passage and closing the second exhaust passage; and then, after the lapse of a third predetermined time,
   (4) opening the second exhaust passage.

22. The method of claim 21, wherein:

when NOx should be released from the NOx absorbent arranged in the first exhaust passage, the first time corresponds to a wait time until exhaust gas stops flowing into the second exhaust passage; and when NOx should be released from the NOx absorbent arranged in the second exhaust passage, the first time corresponds to a wait time until exhaust gas stops flowing into the first exhaust passage.

23. The method of claim 21, wherein:

when NOx should be released from the NOx absorbent arranged in the first exhaust passage, the second time correspond to the time required for holding the fuel added from the fuel addition valve in the first exhaust passage; and when NOx should be released from the NOx absorbent arranged in the second exhaust passage, the second time correspond to the time required for holding the fuel added from the fuel addition valve in the second exhaust passage.

24. The method of claim 23, wherein the second time is shorter the greater the intake air amount.

25. The method of claim 23, wherein the second time is shorter the higher the temperature of the NOx absorbent.

26. The method of claim 21, wherein:

when NOx should be released from the NOx absorbent arranged in the first exhaust passage, the third time corresponds to the time during which the exhaust gas in the first exhaust passage is maintained at a rich air-fuel ratio; and when NOx should be released from the NOx absorbent arranged in the second exhaust passage, the third time corresponds to the time during which the exhaust gas in the second exhaust passage is maintained at a rich air-fuel ratio.

27. The method of claim 26, wherein the third time becomes shorter the greater the intake air amount.

28. The method of claim 26, wherein the third time becomes shorter the higher the temperature of the NOx absorbent.

* * * * *

UNITED STATES PATENT AND TRADEMARK OFFICE
CERTIFICATE OF CORRECTION

PATENT NO. : 7,908,844 B2
APPLICATION NO. : 11/632726
DATED : March 22, 2011
INVENTOR(S) : Shinji Kamoshita et al.

It is certified that error appears in the above-identified patent and that said Letters Patent is hereby corrected as shown below:

In the Title Page:  Change "(86) PCT No.:  PCT/JP2006/009352" to
--(86) PCT No.:  PCT/JP2006/309352--.

Signed and Sealed this
Twentieth Day of September, 2011

David J. Kappos
*Director of the United States Patent and Trademark Office*